United States Patent [19]

Clampitt

[11] 3,727,688

[45] Apr. 17, 1973

[54] HYDRAULIC FRACTURING METHOD

[75] Inventor: Richard L. Clampitt, Bartlesville, Okla.

[73] Assignee: Phillips Petroleum Company, Bartlesville, Okla.

[22] Filed: Feb. 9, 1972

[21] Appl. No.: 224,921

[52] U.S. Cl. ............... 166/283, 166/307, 166/308, 252/8.55 R
[51] Int. Cl. ................ E21b 43/26, E21b 43/27
[58] Field of Search ............. 166/283, 282, 281, 166/280, 294, 271, 270, 308, 307; 252/8.55 R

[56] References Cited

UNITED STATES PATENTS

| | | | |
|---|---|---|---|
| 3,024,191 | 3/1962 | Jones | 166/283 |
| 3,241,612 | 3/1966 | Hiller | 166/294 X |
| 3,343,602 | 9/1967 | Knox et al. | 166/308 X |
| 3,378,070 | 4/1968 | Wessler et al. | 166/294 X |
| 3,383,307 | 5/1968 | Goetz | 252/316 |
| 3,417,820 | 12/1968 | Epler et al. | 166/308 |
| 3,475,334 | 10/1969 | Boudreaux | 166/308 X |
| 3,502,149 | 3/1970 | Pence, Jr. | 166/295 |
| 3,581,824 | 6/1971 | Hurd | 166/270 |
| 3,611,733 | 10/1971 | Eilers et al. | 166/294 X |

Primary Examiner—Stephen J. Novosad
Attorney—Quigg & Oberlin

[57] ABSTRACT

Improvements in hydraulic fracturing of underground porous formations penetrated by a well bore are accomplished by the use of fracturing fluids comprising a gelled solution of a cellulose ether, e.g., carboxymethyl cellulose.

25 Claims, No Drawings

HYDRAULIC FRACTURING METHOD

This invention relates to hydraulic fracturing.

Hydraulic fracturing of subterranean formations penetrated by a bore hole has been widely employed for increasing the production of hydrocarbon fluids, e.g., crude oil, natural gas, from said formations. Hydraulic fracturing comprises the injection of a fracturing fluid down a well penetrating a formation, and into said formation under sufficient pressure to overcome the pressure exerted by the overburden. This results in creating a fracture in said formation which facilitates flow of hydrocarbons through the formation and into the well.

Desirable properties of a hydraulic fracturing fluid include high viscosity, low fluid loss, low friction loss during pumping into the well, stability under the conditions of use such as in high temperature deep wells, and ease of removal from the fracture and well after the operation is complete. It would be desirable to have a fracturing fluid possessing all of these properties.

Higher viscosities for the fracturing fluid aids in producing wider fractures. This is particularly advantageous when a viscous solution is used as a "pad" preceding the acid in combination fracturing-acidizing operations. More viscous solutions also aid in carrying propping agents into the formation when propping agents are used. The common thickener agents of the prior art such as the natural gums (guar gums, etc.) and starches require excessive amounts for worthwhile viscosity increases. Furthermore, solutions of said gums and starches are not viscosity stable at the higher temperatures encountered in deeper wells, e.g., above about 200° F.

The fluid loss properties of the fracturing fluid must be low enough to permit build-up and maintenance of the pressures necessary to fracture the formation. Otherwise, low penetration and/or ineffective fractures will be obtained. Various fluid loss control agents have been proposed in the past for use with various fracturing fluids. However, at best, the use of such fluid loss control agents is an undesirable complicating factor in the preparation and use of fracturing fluids. It would be better to have a fracturing fluid which does not require the use of a fluid loss control agent.

Low friction loss is desirable so as to avoid excessive well head pressures in pumping the fracturing fluid through the casing and tubing and then into the formation. Otherwise, the frictional losses can become prohibitive.

Stability under conditions of use, e.g., retention of sufficient viscosity at temperatures in the order of 200° F. and higher for a period of time sufficient to carry out the fracturing operation, is particularly important when the formations penetrated by deep high temperature wells are being fractured. Fracturing fluids prepared from many of the prior art thickener materials have little more viscosity than the viscosity of water at temperatures of 200° F., and higher.

The ease of removal of the fracturing fluid from the formation is highly important. One disadvantage of using many highly viscous solutions is that they are difficult to remove from the pores or the fracture after the operation is completed. Other high viscosity solutions sometimes leave a clogging residue in the pores of the formation. This inhibits production and often requires costly clean-up operations after the fracturing operation is completed. It would be desirable to have a thickened solution which would break down to a lesser viscosity within a short time after the fracturing job is complete.

The present invention provides a solution for the above-discussed problems. The present invention provides methods of fracturing porous formations employing aqueous gels prepared by gelling solutions of cellulose ethers as described further hereinafter. As shown by the examples given hereinafter, said aqueous gels have all the above-described desirable properties.

Thus, according to the invention, there is provided a method of fracturing a subterranean porous formation penetrated by a wellbore, which method comprises injecting down the well and into said formation, at a pressure sufficient to fracture the formation, a fracturing fluid comprising an aqueous gel, and wherein said gel comprises water to which there has been added: a water-thickening amount of a water-soluble cellulose ether; a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and an amount of a water-soluble reducing agent which is effective to reduce at least a portion of said metal to said lower valence state.

Thus, one embodiment of the invention comprises using said aqueous gels as the fracturing fluid. In the practice of the invention, the aqueous gels can be injected down the well and into the porous formation employing conventional pumping equipment and procedures. If desired, the fracturing fluids used in the practice of the invention can be injected into a selected portion or portions of the porous formation. Said selected portion(s) of the formation can be isolated by employing one or more well packers at proper locations using packers and methods known in the art.

The amount of said fracturing fluid injected into the formation will depend upon the type of formation being treated, the thickness of the formation, the depth or penetration of fracturing desired, etc. Generally speaking, the use of any suitable amount is within the scope of the invention. Thus, the invention is not limited to the use of any particular amount of said aqueous gels as the fracturing fluid. Amounts used in using other fracturing fluids known to the art can be used. Thus, the amount of fracturing fluid can include any amount from 1 to 2,000, or more, gallons per vertical foot of formation.

Another embodiment of the invention comprises a combination fracturing-acidizing treatment. This embodiment of the invention is particularly useful where the formation is susceptible to attack by the acid. In this combination method of the invention the aqueous gels of cellulose ether solutions are used as fracturing "pads" and are injected, prior to injection of the acid, at sufficient pressure to create the fracture. The acid is subsequently injected to react with, etch, and roughen the fracture faces to provide good conductivity when the operation is completed.

In combination fracturing-acidizing treatments it is highly desirable that good penetration of the acid into the formation and good etching of the fracture faces be obtained. This is a problem under almost all circumstances. The severity of the problem increases as the well temperature increases because the acid reactivity with the formation increases with temperature. This results in a reduction in the amount of live acid penetration. Acid penetration can also be reduced by leak-off at the fracture faces. The acid will naturally react in some of the pores adjacent to the fracture. In extreme cases there may be so-called "worm holing" perpendicular to the fracture face. Another cause of acid leak-off is the presence of natural fractures in the formation being treated.

The aqueous gels used in the practice of the invention are particularly well suited to be used as a fracturing pad in combination fracturing-acidizing treatments. Said gels serve several purposes. They reduce the apparent acid reaction rate by reducing contact rate. Said aqueous gels prepared from cellulose ethers are superior to other aqueous gels in wetting and adhering to oil-covered sands. Thus, when the aqueous gel pad is displaced by the acid a thin film will remain sufficiently long to retard the acid reaction rate an amount sufficient to obtain greater penetration. The acid soon destroys the film of gel and performs its intended function of etching and roughening the fracture faces, but not before its action has been retarded sufficiently to permit a greater quantity of live acid to penetrate further into the fracture.

Another valuable purpose of the viscous aqueous gels used in the practice of the invention is that they increase fracture width and length. This provides a greater fracture face for the acid to work on, resulting in fractures having greater conductivity. Fracture width is dependent to a large extent upon the viscosity of the fracturing fluid. As shown in the examples given hereinafter, the aqueous gels used in the practice of the invention have superior high temperature viscosity properties when compared to commercially available gels. These superior viscosity properties result in superior fractures. Still another advantage of the superior viscosity properties is that said gels will carry more and larger propping agents in those embodiments of the invention where propping agents are employed.

Still another purpose served by said aqueous gels is that they serve to cool the well piping during injection, thereby overcoming the limitation of corrosion inhibitors used in the acid.

Propping agents which can be used in the practice of the invention include any of those known in the art, e.g., sand grains, walnut shell fragments, tempered glass beads, aluminum pellets, and similar materials. Generally speaking, it is desirable to use propping agents having particle sizes in the range of 8 to 40 mesh (U.S. Sieve Series). However, particle sizes outside this range can be employed. Propping agents are generally not used in the combination fracturing-acidizing treatments described herein. However, it is within the scope of the invention to use propping agents in said combination treatment. When propping agents are so used they should be made of materials which are not severely attacked by the acid used.

Acids useful in the practice of the invention include any acid which is effective in increasing the flow of hydrocarbons through the formation and into the well. Examples of acids which can be used include inorganic acids such as hydrochloric acid, nitric acid, and sulfuric acid; organic acids such as acetic acid, and formic acid; and combinations of inorganic and organic acids. The concentration or strength of the acid can vary depending upon the type of acid, the type of formation being treated, and the results desired in the particular treating operation. For example, when hydrochloric acid solution is being used in a predominantly limestone formation, the concentration can vary from about 5 to about 38 weight percent HCl, with concentrations within the range of 10 to 30 weight percent usually preferred. Organic acids are usually used in lower concentrations, e.g., about 10 weight percent. One preferred mixture of inorganic acids and organic acids comprises mixtures of hydrochloric acid and acetic acid. For example, 15 percent hydrochloric acid solution containing sufficient acetic acid to bring the total acidity to about 20 to 22 percent, based on equivalent HCl. The acids used in the practice of the invention can contain any of the known corrosion inhibitors, deemulsifying agents, sequestering agents, surfactants, friction reducers, etc., known in the art. The amount of acid used in any particular instance will depend upon a number of factors including the size or amount of formation to be treated, the type of formation being treated, the type of acid, the concentration of the acid, and the formation temperature. Thus, the invention is not limited to using any particular amount of acid in the combination fracturing-acidizing embodiment of the invention. Any suitable amount from about 1 to 750, or more, gallons of acid per vertical foot of formation can be used.

The fracturing operation in accordance with the invention can be carried out in one or more stages. A stage can comprise the following steps. If desired, depending upon the well conditions, the injection of the aqueous gel can be preceded by a small slug of clean-up acid to remove scale, wax deposits, etc., and clean the perforations. This clean-up acid injection can be followed with a preflush of water to cool the casing and the formation. The aqueous gel is then injected. Usually, the acid injection follows the injection of the aqueous gel. The acid slug is then followed with an overflush of water to displace the acid. The second, and any succeeding stages, can comprise the same steps carried out in the same order.

However, it is to be understood the invention is not to be limited to the above combination of steps. Thus, in the embodiments of the invention comprising injecting a gelled solution of a cellulose ether as the fracturing fluid, the only essential step is the injection of the aqueous gel under sufficient pressure to create the fracture. The injection of the aqueous gel can be preceded by any suitable preflush injection steps, etc., and can be followed by any suitable subsequent overflush or other clean-up steps. Similarly, in the combination fracturing-acidizing method of the invention the only essential steps are the injection of the aqueous gel and the subsequent injection of the acid. Generally speaking, in said combination treatment it is preferred to inject the acid immediately following the injection of the aqueous gel fracturing fluid. However, it is within the scope of the invention to inject a slug of water or other spacer liquid between the slug of aqueous gel and the slug of acid.

In general, any of the water-soluble cellulose ethers can be used to prepare the aqueous gels used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC for carboxymethyl cellulose, CMHEC for carboxymethyl hydroxyethyl cellulose, etc. For example, water-soluble CMC is commercially available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in preparing the aqueous gels used in the practice of the invention can vary widely depending upon the viscosity grade and purity of the ether, and properties desired in said aqueous gels. In general, the amount of cellulose ether used will be a water-thickening amount, i.e., at least an amount which will significantly thicken the water to which it is added. For example, amounts in the order of 25 to 100 parts per million weight (0.0025 to 0.01 weight percent) have been found to significantly thicken water. Water containing 25 ppm of CMC has a viscosity increase of about 21 percent. At 50 ppm the viscosity increase is about 45 percent. At 100 ppm the viscosity increase is about 195 percent. Generally speaking, amounts in the range of from 0.0025 to 20, preferably from 0.01 to 5, more preferably 0.025 to 1, weight percent, based on the weight of water, can be used. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce stiff rigid gels. If desired, said stiff gels can be "thinned" by dilution to any desired concentration of cellulose ether. This can be done by mechanical means, e.g., stirring, pumping, or by means of a suitable turbulent inducing device to cause shearing, such as a jet nozzle. Thus, there is really no fixed upper limit on the amount of cellulose ether which can be used. However, when a liquid mobile gel is desired, it is preferred to dilute the more concentrated gels before they become rigid.

Metal compounds which can be used in preparing the aqueous gels used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used in preparing the aqueous gels used in the practice of the invention will be a sensible amount, i.e., a small but finite amount which is more than incidental impurities, but which is effective or sufficient to cause subsequent gellation when the metal in the polyvalent metal compound is reduced to a lower polyvalent valence state. The lower limit of the concentration of the starting metal-containing compound will depend upon several factors including the particular type of cellulose ether used, the concentration of the cellulose ether in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As discussed further hereinafter in the examples, this provides one valuable method for controlling gel stability so as to obtain gels which will break down with time and/or temperature to permit ready well clean-up subsequent to a fracturing operation. As a general guide, the amount of the starting polyvalent metal-containing compound used in preparing aqueous gels in accordance with the invention will be in the range of from 0.05 to 60, preferably 0.5 to 30, weight percent of the amount of the cellulose ether used.

Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of cellulose ether. Preferably, the amount of said metal capable of being reduced which is used will not exceed $4 \times 10^{-3}$, more preferably $2 \times 10^{-3}$, gram atoms of said metal per gram of cellulose ether. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, I have discovered that when brines such as are commonly available in producing oil fields, are used as the water in preparing gels for use in the practice of the invention, less of the starting polyvalent metal-containing compound is required than when distilled water is used. Stable gels have been prepared using brines having a wide range of dissolved solids content, e.g., from 850, 1,200, 6,000, and 90,000 ppm dissolved solids. Gellation rates are frequently faster when using said brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

Suitable reducing agents which can be used in preparing the aqueous gels used in the practice of the invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., requiring heating to about 125°–130° F. The presently most preferred reducing agents are sodium hydrosulfite, potassium hydrosulfite, sodium thiosulfate, and potassium thiosulfate.

The amount of reducing agent to be used in preparing the aqueous gels used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels used in the practice of the invention. Either the metal-containing compound or the reducing agent can be first added to a solution of the cellulose ether in water or other aqueous medium, or said metal-containing compound and said reducing agent can be added simultaneously to the solution or aqueous medium containing the cellulose ether. Generally speaking, where convenient, the preferred method is to first disperse the cellulose ether in the water or other aqueous medium. The metal-containing compound is then added to the solution or aqueous medium containing the cellulose ether and the reducing agent, with stirring. The reducing agent is then added to the dispersion of cellulose ether, with stirring. Gellation starts as soon as reduction of some of the higher valence metal in the starting polyvalent metal-containing compound to a lower valence state occurs. The newly-formed lower valence metal ions, for example +3 chromium obtained from +6 chromium, effect rapid crosslinking of the cellulose ethers and gellation of the solution or aqueous medium containing same.

It is also within the scope of the invention to prepare a dry mixture of the cellulose ether, the metal-containing compound and the reducing agent, in proper proportions, and then add this dry mixture to the proper amount of water.

An advantage of the invention is that ordinary ambient temperatures and other conditions can be used in practically all instances in preparing the aqueous gels or aqueous mediums containing same. However, in some instances, a small amount of heat may be desirable to aid in the formation of the gel, e.g., heating to a temperature of about 125°–130° F.

Aqueous gels can be prepared having a wide range of viscosities or firmness ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of the cellulose ether, the type and amount of starting polyvalent metal compound used, and the type and amount of reducing agent used.

One procedure which can be used to prepare said gels is to prepare a relatively concentrated or high viscosity gel and dilute same to a viscosity or concentration suited for the actual use of the gel. In many instances, this procedure results in a more stable gel. This should be taken into consideration since in the practice of the present invention highly stable gels are not, generally speaking, desirable. Gels having good initial stability sufficient to permit pumping and placement in the formation to fracture same, but which will break down with time and/or temperature to permit easy well clean-up are most useful in the practice of the present invention. Generally speaking, it is preferred that said gels have a stability, e.g., viscous life, within the range of about 15 minutes to about 12 hours.

When employing said dilution technique a starting solution of cellulose ether containing, for example, 1,000 to 10,000 ppm (0.1 to 1 wt. percent), or more, of cellulose ether can be used. This solution is then gelled by the addition of suitable amounts of polyvalent metal compound and reducing agent. After gellation has proceeded to the desired extent, the resulting gel can be diluted to the concentration or viscosity most suited for its intended use. The more concentrated cellulose ether solutions usually have a faster rate of gellation. Thus, in most instances, it will be preferred to carry out the dilution soon after the components of the gel have been added to the water or other aqueous medium, e.g., within about 5 to 30 minutes. Preferably, the concentration of the cellulose ether in the "concentrated gel" will be at least twice that in the final gel. Dilution of the gel retards the rate of gellation. Thus, this dilution technique can be employed to control the gellation rate, if desired. One advantage of said dilution technique is that it is usually more convenient to weigh out and handle the larger quantities of reagents.

Generally speaking, the pH of the final solution of the gelling reagents is preferably less than 7, more preferably in the order of 6. In general, pH is not controlling, but higher pH values retard gellation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels used in the practice of the invention are defined for convenience, and not by way of limitation, in terms of the amount of cellulose ether contained therein, irrespective of whether or not all the cellulose ether is crosslinked. For example, a 1 weight percent or 10,000 ppm gel is a gel which was prepared from a starting cellulose ether solution which contained 1 weight percent or 10,000 ppm by weight of cellulose ether. The same system is employed for the gels prepared by the above-described dilution technique.

The following examples will serve to further illustrate the invention.

EXAMPLE I

It is the purpose of this example to demonstrate that gels of CMC solutions exhibit high viscosities at relatively high temperatures. A solution was prepared by mixing 2.4 grams of CMC-9 in 500 cc of Bartlesville, Oklahoma, tap water to form a 4800 ppm (by weight) solution. To said solution there was added 7.5 cc of a 10 percent weight solution of sodium dichromate ($Na_2Cr_2O_7 \cdot 2H_2O$), followed by mild stirring. (The solutions were at room temperature — 75° F.). Following the addition of the sodium dichromate, the solution was placed in a water bath and the temperature thereof increased to 130° F. over a period of 5 to 10 minutes. When the temperature reached 130° F., 23.5 cc of a 20 percent by weight solution of sodium thiosulfate ($Na_2S_2O_3 \cdot 5H_2O$), a reducing agent, was added to initiate gellation, followed by hand stirring for 60 seconds. A portion was then poured into a stainless steel cup of a high pressure, high temperature Model 50 Fann Viscometer so the rate of gellation with temperature and time could be monitored. The concentration of the final ingredients, considering dilution due to the addition of the final two chemicals, follows:

| Component | Concentration, ppm by weight |
| --- | --- |
| CMC-9 | 4520 |
| Sodium Dichromate ($Na_2Cr_2O_7 \cdot 2H_2O$) | 1410 |
| Sodium Thiosulfate ($Na_2S_2O_3 \cdot 5H_2O$) | 8850 |

The rate of gellation, as exhibited by increased viscosity, was measured as the final mixture was heated by the oil bath surrounding the holding cup on a standard Model 50 Fann Viscometer. The data in Table I show the viscosity increased from 18.5 centipoises at a shear rate of 500 $sec^{-1}$ after the addition of the last component to a peak viscosity of 115 centipoises at a temperature of 237° F. and then slowly decreased as the temperature was raised to 303° F. The heat-up rate was an approximate simulation of heat-up rates which occurred in a hydraulically-induced fracture in fracture-acidizing treatments of deep Ellenburger gas wells in the Gomez field in Pecos County, Texas. The example clearly demonstrates a technique for preparing viscous gels useful as fracturing fluids.

TABLE I

Viscosity of Gelled CMC Solution

| Time Following Addition of Last Gelling Component, Minutes | Temperature of Gelled CMC Solution in Fann Viscometer, °F. | Viscosity* of Gelled CMC Solution, Centipoise at Shear Rate of 170 $sec^{-1}$ | at Shear Rate of 500 $sec^{-1}$ |
| --- | --- | --- | --- |
| 8 | 130 | Not Measured | 18.5 |
| 10.5 | 137 | " | 25 |
| 13 | 140 | " | 33 |
| 15 | 145 | " | 44 |
| 16.5 | 150 | " | 50 |
| 18 | 160 | " | 60 |
| 20 | 170 | " | 74 |
| 22 | 180 | " | 87 |
| 24 | 195 | " | 102 |
| 26 | 203 | " | 108 |
| 28 | 218 | " | 112 |
| 29 | 225 | 198 | N.M. |
| 31 | 237 | Not Measured | 115 |
| 32 | 243 | " | 110 |
| 32.5 | 250 | 180 | N.M. |
| 34 | 255 | Not Measured | 100 |
| 35.5 | 265 | " | 90 |
| 37 | 275 | 120 | 77 |
| 39 | 283 | Not Measured | 60 |
| 41 | 293 | " | 40 |
| 42 | 300 | " | 35 |
| 43 | 303 | 39 | N.M. |

*Measured by a high temperature, high pressure, Fann Model 50 Rotational Viscometer at a pressure of 500 psi.

EXAMPLE II

It is the purpose of this example to demonstrate that gels of CMC solutions will form while the mixture is being pumped or circulated in turbulent flow and to present friction loss characteristics useful in calculating pressure drops which will be obtained in tubular goods during fracture treatments where said gels are used.

A quantity of CMC-9 was added through an eductor to Duncan, Oklahoma, tap water in a 250 gallon Halliburton ribbon blender. The final CMC concentration was 40 pounds per thousand gallons or approximately 4800 parts per million based upon the weight of the water. The solution was maintained at 130° F. constant temperature throughout this preparation. When the CMC solution reached full hydration as indicated by a 300 rpm reading on a Model 35 Fann V-G meter (viscometer), sodium dichromate ($Na_2Cr_2O_7 \cdot 2H_2O$) was added to the CMC solution in an amount sufficient for a concentration of 12 pounds per thousand gallons of CMC solution which is approximately equivalent to 1440 parts per million. The sodium dichromate was readily soluble and went into solution in less than 5 minutes in the ribbon blender tank. This solution was used as a base solution in the tests described below.

a. Friction loss tests were run on a portion of said base solution while circulating same in turbulent flow, under controlled conditions of temperature and velocity, through a nominal one-inch diameter pipe loop having a test section 40 feet in length. Pressure drop readings were taken during said calculation. The data obtained were employed to calculate the friction loss which could be expected in pumping said base solution into a well under the following conditions: well depth — 22,500 feet; casing — 17,000 feet of 5-½ inch, 23 lb./ft. steel casing and 5,500 feet of 5 inch, 23.2 lb./ft. steel casing; surface injection temperature of 130° F.; a formation temperature of 350° F. at 22,500 feet; and pumping rates of 25 and 30 barrels per minute. These calculated data are set forth in Table II below.

b. Friction loss tests, and rate of gellation measurements, were run on another portion of said base solution in which gellation was effected while the base solution was being circulated as described in paragraph (a) above. Gellation was effected by adding to the circulating solution sufficient sodium thiosulfate, $Na_2S_2O_3 \cdot 5H_2O$, (in solution) to provide 1440 ppm by weight in the circulating solution. Pressure drop readings were taken during said circulation. The data showed that gellation was retarded for about 370 seconds before the gelled solution showed any gelled characteristics which could increase friction losses over an ungelled system. It was concluded this system could properly be called a retarded gelling system since no significant amount of gellation occurred for about 6 minutes. Friction loss for the well conditions listed in paragraph (a) above was calculated from the data obtained. These calculated data are set forth in Table II below.

c. Friction loss tests, and rate of gellation measurements, were run on another portion of said base solution, as described in paragraph (b) above, except that gellation was effected by adding to the circulating solution sufficient sodium hydrosulfite, $Na_2S_2O_4$, (in solution) to provide 1440 ppm by weight in the circulating solution. Pressure drop readings were taken during said circulation. The data showed that gellation begain within 60 seconds following addition of the sodium hydrosulfite. This system would not be considered a retarded system at the temperature tested (approx. 130° F.). Friction loss for the above-described well conditions were calculated from the data obtained. See Table II below.

d. Friction loss tests were also run on Duncan, Oklahoma, tap water while being circulated as described in paragraph (a) above. Friction loss for the well conditions listed in paragraph (a) above was calculated from the data obtained. These calculated data are set forth in Table II below.

TABLE II

Comparison of Calculated Friction Loss Values

| Injection Rate, Bbls./minute | Total Pressure Drop, psi |
|---|---|
| Fresh Water (d) | |
| 25 | 2420 |
| 30 | 3390 |
| Ungelled CMC Solution (a) | |
| 25 | 1762 |
| 30 | 2151 |
| CMC Soln. Gelled During Pumping (b) | |
| 25 | 2141 |
| 30 | 2540 |
| CMC Soln. Gelled During Pumping (c) | |
| 25 | 2144 |
| 30 | 2340 |

The above tests and data show that solutions of CMC are friction-reducing agents as compared to plain water. Gelled solutions of CMC gelled during pumping are also friction-reducing agents as compared to water because they can be pumped at high rates down casing in a well with less horsepower than is required for pumping water. Gelling of the CMC solution during pumping is presently preferred because it affords another measure of control over gellation rate. The above-described retarded system using sodium thiosulfate as the reducing agent affords further control over gellation rate.

Calculated values for a comparable solution of CMC "fully gelled" prior to pumping are 3050 and 3677 psi total pressure drop at pumping rates of 25 and 30 barrels per minute, respectively, in the above-described 22,500 feet string of pipe. This shows the advantage of gelling during pumping.

The above example also illustrates one presently preferred method of carrying out a fracturing operation. Said method comprises preparing a base fracturing fluid comprising a solution of a cellulose ether, adding to this base solution (a) a polyvalent metal compound such as sodium dichromate or (b) a reducing agent such as sodium thiosulfate or sodium hydrosulfite, pumping a slug of said base fracturing fluid down the well and into the formation under sufficient pressure to create the fracture, and during said pumping adding to said base fracturing fluid the other of said reagents (a) and (b) which was not previously added thereto. It is also within the scope of the invention to incorporate all the components of the aqueous gel into a stream of water while it is being pumped, e.g., into a well. For example, CMC could be added first to the flowing stream of water and the other components added subsequently in any suitable order. Turbulent flow conditions in the pipe will provide proper mixing.

EXAMPLE III

This example is an illustration of the breakdown of gelled solutions of CMC upon exposure to elevated temperatures. Gelled solutions of sodium carboxymethyl cellulose (CMC-7 and CMC-9) were prepared to contain about 5000 ppm by weight of CMC, about 1500 ppm of $Na_2S_2O_4$, and about 1500 ppm of $Na_2Cr_2O_7 \cdot 2H_2O$. The gelled solutions were prepared by first dispersing the CMC in water and then adding thereto solutions of the $Na_2S_2O_4$ and $Na_2Cr_2O_7$, with stirring. Samples of said gelled solutions were then subjected to elevated temperatures in the order of 300°, and 350° F., for varying periods of time, under pressures in the order of 15,000 to 20,000 psi in an Amoco cement consistometer. Viscosity determinations were then run in a Model 35 Fann VG meter after the samples had cooled. From these viscosity determinations it was concluded that the gelled solutions were self-breaking at elevated temperatures, and that the breaking time decreases with increases in temperature. For example, said viscosity determinations indicated that the break time of the gelled solutions of CMC studied in this example was in the order of 8 to 12 hours at 300° F., and 2 to 3 hours at 350° F. These data indicate that gelled solutions of CMC can be used as fracturing fluids in high temperature formations, and that said gels will break down after a relatively short time to permit easy well clean-up.

EXAMPLE IV

There are several methods by which gelled solutions of CMC can be caused to break down with time so their final viscosity approximates that for ungelled CMC solution, or water. One method is to use excessive amounts of the gelling agents which will produce adequate viscosity and gel strengths required during the fracture treatment, but which will subsequently cause breakdown to a thin solution, allowing rapid well clean-up following a fracture treatment. The data in Table IV below set forth results of three gelled solutions of CMC-9 prepared in essentially the same manner, but gelled with differing amounts of gelling agents. Solution No. 3 gelled the fastest and also broke down more quickly because of an excessive amount of gelling agents. Solution No. 1, gelled with about one-sixth the amount of gelling agents used with Solution No. 3, required about 18 minutes to reach maximum viscosity before it began to break down. Significantly less gelling agents are required to gel solutions of CMC made with hard brines than are required to gel solutions made with fresh water. As the salinity of the water increases, the rate of gellation of CMC solutions increases. The "life-span" of gelled solutions of CMC can be controlled by tailoring the amounts of gelling agents in accordance with the water and temperature conditions that will be encountered.

TABLE IV

Effect of Concentration of Gelling
Agents Upon Viscosity of Gelled
CMC Solutions

| Time after addition of last gelling agent, minutes | Apparent Viscosity, centipoise at 170 sec$^{-1}$ | | |
|---|---|---|---|
| | Solution No. 1 | Solution No. 2 | Solution No. 3 |
| 0 | 21.6 | 21.6 | 21.6 |
| 0.25 | N.M.(1) | N.M. | 81.0 |
| 0.50 | N.M. | N.M. | N.M. |
| 1.0 | N.M. | N.M. | 46.5 |
| 2.0 | 48 | 34.5 | 33.0 |
| 3.0 | 49.5 | 36.0 | 26.1 |
| 4.0 | 60.0 | 45.0 | 21.6 |
| 5.0 | N.M. | 48 | 18.0 |
| 6.0 | 75.0 | N.M. | 15.6 |
| 7.0 | N.M. | 57.0 | 14.4 |
| 8.0 | 81.0 | N.M. | N.M. |
| 10.0 | 90.0 | 54.0 | N.M. |
| 13.0 | 96.0 | N.M. | N.M. |
| 16.0 | 111.0 | 31.5 | N.M. |
| 18.0 | 120.0 | N.M. | N.M. |
| 23.0 | 105.0 | 22.5 | N.M. |
| 32.0 | N.M. | 21.0 | N.M. |
| 52.0 | 39.0 | N.M. | N.M. |
| 79.0 | 24.0 | 15.0 | N.M. |
| 218 | 18.0 | N.M. | N.M. |

(1) N.M. = not measured

The gelled solutions used to obtain the data in the above Table IV were prepared as follows. To one liter of actual produced brine from the North Burbank Unit (Burbank, Oklahoma — total dissolved solids approximates 90,000 ppm) there was added 5 grams of CMC-9 to form a 5000 ppm solution. The solution was stirred 5 minutes on a malt mixer and allowed to stand for 30 minutes to reach maximum viscosity of 21.6 centipoises at a shear rate of 170 sec$^{-1}$, as measured with a Model 35 Fann VG meter at a temperature of 70° F. The one-liter solution was then split into three equal portions, designated Solutions 1, 2, and 3, and placed in cups on Fann viscometers. The solutions were stirred continuously at 100 rpm which is equivalent to a shear rate of 170 sec$^{-1}$. Each of the solutions was gelled by first adding sodium dichromate and then adding sodium hydrosulfite so that the final solutions had the following compositions:

| Ingredients | Solutions | | |
|---|---|---|---|
| | 1 | 2 | 3 |
| CMC, ppm | 5000 | 5000 | 5000 |
| $Na_2Cr_2O_7 \cdot 2H_2O$, ppm | 500 | 1000 | 3000 |
| $Na_2S_2O_4$, ppm | 500 | 1000 | 3000 |

EXAMPLE V

Different, and excessive, amounts of gelling agents were used to prepare gelled solutions of CMC-9 using a relatively fresh water (total dissolved solids of 1100 parts per million). A base CMC solution was prepared by mixing 3.57 grams of CMC in one liter of said water at room temperature on a multimixer. Concentration of the CMC approximated 3570 parts per million. The resulting solution was divided into three equal portions by volume. Two portions were gelled using two different reducing agents, and sodium dichromate, and the other portion was used for base viscosity comparisons. Table V below shows that high viscosities were developed in less than 5 hours for the two gelled solutions, and the gels eventually broke down to lower level viscosities within 7 days.

TABLE V

Effect of Reducing Agents and
Metal Salts on Gels of CMC
Solutions

| | Apparent Viscosities After Aging at Room Temperature — centipoise (measured at 500 sec$^{-1}$ on Fann VG meter) Time After Addition of Last Gelling Agent | | | |
|---|---|---|---|---|
| | 5 Min. | 5 hours | 3 days | 7 days |
| 1. Ungelled CMC Solution | 22.5 | 21.0 | 21.0 | 20.0 |
| 2. Gelled CMC Solution (3570 ppm CMC) (2140 ppm of $Na_2S_2O_4$) (1430 ppm of $Na_2Cr_2O_7 \cdot 2H_2O$) | 150+ | 3.0 | | |
| 3. Gelled CMC Solution (3570 ppm CMC) (715 ppm of $C_6H_8O_2$) (1140 ppm of $Na_2Cr_2O_7 \cdot 2H_2O$) | 15 | 150+ | 150+ | 45.5 |

The data in the above Examples I–V show that the rate of gellation of solutions of CMC, and/or the life-span of the resulting gel, can be tailored in accordance with conditions encountered in the field. This can be done be taking into consideration the temperature of the formation where the gel is to be used, the amount of gelling agents used in preparing the gels, and the water used in preparing the gels. Thus, a gel can be tailored to have a life-span of 12, 8, 4, or even 2 hours, or less, so that the gel will break down to a viscosity approaching that of water within the time selected. This will permit ready well clean-up after the fracturing treatment and permit ready removal of the gel residue, such as by producing of formation fluids. Gels can be prepared which will break back to viscosities of less than about 20 centipoises, or even to the viscosity of water, by proper consideration of the above-mentioned factors.

EXAMPLE VI

Four fracturing fluids were tested for high temperature viscosity properties. These fluids were: (1) a gelled solution of CMC-9, concentration 4800 ppm by weight; (2) a gelled solution of CMC-9, concentration 3600 ppm by weight; (3) a gelled solution of guar gum (commercially available), concentration 9600 ppm by weight; and (4) an ungelled solution of a commercially available modified guar gum.

Fluid (1) was prepared by dry blending predetermined portions of CMC-9 and $Na_2Cr_2O_7 \cdot 2H_2O$. The resulting blend was then added to 5 liters of Duncan, Oklahoma, tap water, with stirring on a Waring blender at low speed for 20 minutes. The resulting solution contained 4800 ppm by weight of CMC and 1440 ppm by weight of $Na_2Cr_2O_7 \cdot 2H_2O$. The solution was then transferred to a one-quarter inch diameter pipe loop friction loss testing apparatus. This apparatus comprised a pipe loop provided with heating means and circulating means for measuring friction losses during simulated pumping operations. The solution was heated from room temperature to 130° F. while being circulated. An amount of $Na_2S_2O_4$ sufficient to provide 1440 ppm by weight (based on the above 5-liter solution of CMC — $Na_2Cr_2O_7 \cdot 2H_2O$) was dissolved in 150 ml of water and added to the circulating solution. Gellation was initiated in less than one minute. Circulation was continued for about 30 minutes and then terminated. The gelled solution was permitted to set overnight and cool to room temperature. The following day the viscosity of the gel was determined over the range of 70° to 300° F. employing a recording high temperature, high pressure Model 50 Fann viscometer at a pressure of 550 psi. During these viscosity measurements the temperature was increased from 70° F. to 300° F. in 20 minutes.

Fluid (2) was prepared and tested in essentially the same manner as described above for fluid (1), except that fluid (2) contained 3600 ppm by weight of CMC-9, 1080 ppm by weight of $Na_2Cr_2O_7 \cdot 2H_2O$, and 1080 ppm by weight of $Na_2S_2O_4$. During the viscosity measurements the temperature was increased from 70° F. to 290° F. in 17 minutes.

Fluid (3), the commercially available gelled solution of guar gum (exact composition not known), was prepared in a concentration of 9600 ppm by weight in Duncan, Oklahoma, tap water using the standard gelling agent (also unknown). The mixture was stirred one minute on a malt mixer. The solution gelled immediately at room temperature upon addition of the gelling agent. This gel is available commercially as a fracturing fluid. Viscosity determinations were made on the gel in the same manner as described above. During the viscosity measurements the temperature was increased from 70° F. to 300° F. in 16 minutes.

Fluid (4) was prepared by mixing a portion of the modified guar gum in a sufficient portion of Duncan, Oklahoma, tap water to give a guar gum concentration of 3600 ppm by weight. The mixture was stirred one minute on a malt mixer. This fluid is available commercially as a fracturing fluid. Viscosity determinations were made on this fluid in the same manner as described above. During the viscosity measurements the temperature was increased from 75° F. to 210° F. in 17.5 minutes.

For comparison purposes a plot of Viscosity-Centipoise at $511^{-1}$ seconds shear rate vs. Temperature — °F. was made for each of said four fluids. A smooth curve was obtained for each fluid. Table VI below sets forth a direct comparison of the viscosities of said four fluids at temperature intervals of 25° F.

TABLE VI

| Temp. °F. | Apparent Viscosity — cp. at $511^{-1}$ sec. shear rate | | | |
|---|---|---|---|---|
| | Fluid (1) | Fluid (2) | Fluid (3) | Fluid (4) |
| 75 | 200 | 125 | 70 | 17 |
| 100 | 182 | 100 | 43 | 13 |
| 125 | 187 | 98 | 38 | 10 |
| 150 | 200 | 102 | 45 | 7 |
| 175 | 202 | 100 | 46 | 4 |
| 200 | 195 | 90 | 30 | 1 |
| 225 | 180 | 76 | 22 | |
| 250 | 164 | 62 | 20 | |
| 275 | 147 | 50 | 16 | |
| 300 | 130 | 38 | 13 | |

The above data clearly show the superior viscosity properties of Fluids (1) and (2) at high temperatures.

EXAMPLE VII

High temperature fluid loss values were obtained on a gelled solution of CMC-9 containing 5000 ppm by weight of CMC, and gelled by adding thereto 1500 ppm by weight of $Na_2Cr_2O_7 \cdot 2H_2O$ and 1500 ppm by weight of $Na_2S_2O_4$. These fluid loss values were obtained employing a Baroid No. 387 filter press, using three Baroid 988 filter papers, and the procedure described in API RP 13B, Third Edition, February 1971. The spurt loss values were obtained by plotting fluid loss versus the square root of time. The spurt loss is the value of the zero time intercept of this plot. The m values are the slope of the plotted line. The results of the tests are set forth in Table VII below.

TABLE VII

| | 200° F. 1000 psi | 250° F. 1000 psi | 300° F. 1000 psi |
|---|---|---|---|
| Fluid loss, ml./25 min. | 28.3 | 38.4 | 46.6 |
| Spurt Loss, ml. | 0 | 0 | 1.4 |
| m(Fluid loss − Spurt Loss)/5 | 5.7 | 7.7 | 9.0 |

The above data show that gelled solutions of CMC have good fluid loss characteristics at high temperatures.

In the practice of the invention, the fracturing fluids can be injected into the formation at any suitable pressures sufficient to overcome the weight of the overburden. As will be understood by those skilled in the art, this will vary from region to region. However, generally speaking, said pressures will be in the range of from 0.5 to 1.5 psi per foot of well depth.

Herein and in the claims, unless otherwise specified, the term "solution" is employed generically and includes colloidal solutions as well as true solutions.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method of fracturing a subterranean porous formation penetrated by a wellbore, which method comprises injecting down the well and into said formation, at a pressure sufficient to fracture the formation, a fracturing fluid comprising an aqueous gel, and wherein said gel comprises water to which there has been added:
   a water-thickening amount of a water-soluble cellulose ether;
   a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and
   an amount of a water-soluble reducing agent which is effective to reduce at least a portion of said metal to said lower valence state.

2. A method according to claim 1 wherein said aqueous gel comprises water to which there has been added:
   from 0.0025 to 20 weight percent of said cellulose ether, based upon the weight of said water;
   from 0.05 to 60 weight percent of said polyvalent metal compound based upon the weight of said cellulose ether; and
   from 0.1 to at least about 200 percent of the stoichiometric amount of said reducing agent required to reduce said polyvalent metal to said lower polyvalent valence state.

3. A method according to claim 2 wherein said cellulose ether is a carboxymethyl cellulose ether.

4. A method according to claim 3 wherein said compound of a polyvalent metal is a compound of chromium wherein the valence of the chromium is +6 and the valence of at least a portion of said chromium is reduced to +3.

5. A method according to claim 4 wherein said chromium compound is selected from the group consisting of ammonium chromate, ammonium dichromate, the alkali metal chromates and dichromates, chromium trioxide, and mixtures thereof.

6. A method according to claim 5 wherein said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

7. A method according to claim 2 wherein:
   said cellulose ether is sodium carboxymethyl cellulose;
   said polyvalent metal compound is sodium dichromate; and
   said reducing agent is sodium hydrosulfite.

8. A method according to claim 2 wherein:
   said cellulose ether is sodium carboxymethyl cellulose;
   said polyvalent metal compound is sodium dichromate; and
   said reducing agent is sodium thiosulfate.

9. A method according to claim 1 wherein:
   said formation is susceptible to attack by an acid;
   a slug of said fracturing fluid comprising said gel is injected into said formation; and
   a slug of an acid is injected into said formation subsequent to the injection of said fracturing fluid.

10. A method according to claim 9 wherein a slug of a spacer fluid is injected into said formation after the injection of said fracturing fluid and prior to injecting said acid.

11. A method according to claim 9 wherein said acid is selected from the group consisting of hydrochloric acid, formic acid, acetic acid, and mixtures thereof.

12. A method according to claim 11 wherein said aqueous gel comprises water to which there has been added:
   from 0.025 to 1 weight percent of said cellulose ether, based upon the weight of said water;
   from 0.5 to 40 weight percent of said polyvalent metal compound, based upon the weight of said cellulose ether; and
   from 0.5 to at least about 150 percent of the stoichiometric amount of said reducing agent required to reduce said polyvalent metal to said lower polyvalent valence state.

13. A method according to claim 12 wherein:
   said cellulose ether is an alkali metal carboxymethyl cellulose; and
   said polyvalent metal compound is an alkali metal dichromate.

14. A method according to claim 13 wherein:
   said cellulose ether is sodium carboxymethyl cellulose;
   said polyvalent metal compound is sodium dichromate;
   said reducing agent is sodium hydrosulfite or sodium thiosulfate; and
   said acid comprises a solution of hydrochloric acid.

15. A method according to claim 1 wherein the temperature of said formation is greater than about 200° F. and the life-span of said gel is such that it breaks down to a viscosity approaching that of water in less than about 12 hours.

16. A method according to claim 1 wherein an excessive amount of said gelling agents is used, relative to the amount of said cellulose ether, so that the life-span of said gel is such that it breaks down to a viscosity approaching that of water in less than about 12 hours.

17. A method of fracturing a subterranean porous formation penetrated by a wellbore, which method comprises, in combination, the steps of:
   A. forming a base fracturing fluid by adding to a given quantity of water from 0.025 to 1 weight percent of a water-soluble cellulose ether, based on the weight of said water;
   B. adding to said base fracturing fluid one of (a) from 0.5 to 40 weight percent of a water-soluble compound of chromium wherein the valence of the chromium is +6 and which is sufficient to gel said water when the valence of at least a portion of said chromium is reduced from +6 to +3, or (b) from 0.5 to at least about 150 percent of the stoichiometric amount of a water-soluble reducing agent which is effective to reduce the valence of said chromium from +6 to +3;

C. pumping a slug of said base fracturing fluid of step (B) down said well and into said formation under a pressure sufficient to create a fracture in said formation; and D. during said pumping adding to said base fracturing fluid the other of said reagents (a) and (b) which was not added thereto in said step (B).

18. A method according to claim 17 wherein:
said cellulose ether is a carboxymethyl cellulose ether;
said chromium compound is selected from the group consisting of ammonium chromate, ammonium dichromate, the alkali metal chromates and dichromates, chromium trioxide, and mixtures thereof; and
said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

19. A method according to claim 18 wherein:
said cellulose ether is an alkali metal carboxymethyl cellulose; and
said chromium compound is an alkali metal dichromate.

20. A method according to claim 19 wherein:
said cellulose ether is sodium carboxymethyl cellulose;
said chromium compound is sodium dichromate; and
said reducing agent is sodium thiosulfate or sodium hydrosulfite.

21. A method according to claim 17 wherein said formation is susceptible to attack by an acid, and said method comprises in further combination the step of:
E. injecting a slug of an acid into said formation subsequent to the injection of said fracturing fluid as in said steps (C) and (D).

22. A method according to claim 21 wherein a slug of a spacer fluid is injected into said formation after said steps (C) and (D) and prior to said step (E).

23. A method according to claim 21 wherein:
said cellulose ether is a carboxymethyl cellulose ether;
said chromium compound is selected from the group consisting of ammonium chromate, ammonium dichromate, the alkali metal chromates and dichromates, chromium trioxide, and mixtures thereof;
said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof; and
said acid is selected from the group consisting of hydrochloric acid, formic acid, acetic acid, and mixtures thereof.

24. A method according to claim 23 wherein:
said cellulose ether is sodium carboxymethyl cellulose;
said chromium compound is sodium dichromate; and
said reducing agent is sodium thiosulfate or sodium hydrosulfite.

25. A method according to claim 24 wherein:
said cellulose ether is sodium carboxymethyl cellulose;
said chromium compound is sodium dichromate;
said reducing agent is sodium thiosulfate or sodium hydrosulfite; and
said acid comprises a solution of hydrochloric acid.

* * * * *